(12) United States Patent
Yang et al.

(10) Patent No.: US 10,442,923 B2
(45) Date of Patent: Oct. 15, 2019

(54) SEMICONDUCTIVE COMPOSITION FOR POWER CABLE

(71) Applicant: DYM SOLUTION CO., LTD., Cheonan-si, Chungcheongnam-do (KR)

(72) Inventors: Jong Seok Yang, Cheonan-si (KR); Jae Gyu Han, Cheonan-si (KR); Geun Bae Jeon, Cheonan-si (KR); Dong Ha Park, Seoul (KR)

(73) Assignee: DYM Solution Co., Ltd., Cheonan-si, Chungcheongnam-do (KR)

( * ) Notice: Subject to any disclaimer, the term of this patent is extended or adjusted under 35 U.S.C. 154(b) by 0 days.

(21) Appl. No.: 16/053,704

(22) Filed: Aug. 2, 2018

(65) Prior Publication Data

US 2019/0040243 A1    Feb. 7, 2019

(30) Foreign Application Priority Data

Aug. 2, 2017 (KR) .......................... 10-2017-0098253

(51) Int. Cl.
| | |
|---|---|
| *H01B 1/24* | (2006.01) |
| *C08L 23/00* | (2006.01) |
| *C08L 23/12* | (2006.01) |
| *C08L 23/08* | (2006.01) |
| *H01B 9/02* | (2006.01) |
| *H01B 13/24* | (2006.01) |
| *B82Y 30/00* | (2011.01) |
| *B82Y 40/00* | (2011.01) |

(52) U.S. Cl.
CPC ........... *C08L 23/12* (2013.01); *C08L 23/0869* (2013.01); *H01B 1/24* (2013.01); *H01B 9/027* (2013.01); *H01B 13/24* (2013.01); *B82Y 30/00* (2013.01); *B82Y 40/00* (2013.01); *C08L 2203/202* (2013.01); *C08L 2205/02* (2013.01); *C08L 2205/03* (2013.01)

(58) Field of Classification Search
CPC .......... H01B 9/02; C08L 23/025; C08L 25/02
See application file for complete search history.

(56) References Cited

U.S. PATENT DOCUMENTS

| | | | | |
|---|---|---|---|---|
| 10,308,794 B2 * | 6/2019 | Steffl | ....................... | C08L 23/10 |
| 2013/0133922 A1 * | 5/2013 | Steffl | ....................... | C08L 23/14 |
| 2015/0004411 A1 * | 1/2015 | Malik | ................. | C08L 23/0853 |
| | | | | 428/375 |

FOREIGN PATENT DOCUMENTS

| | | | |
|---|---|---|---|
| KR | 10-2012-0048520 A | 5/2012 | |
| KR | 10-2014-0126993 A | 11/2014 | |

* cited by examiner

*Primary Examiner* — Mark Kopec
(74) *Attorney, Agent, or Firm* — Knobbe Martens Olson & Bear LLP

(57) ABSTRACT

Provided is a semiconductive resin composition which may be used for both an internal semiconductive layer and an internal semiconductive layer of a power cable, and in particular has excellent peelability to be used for the external semiconductive layer. In addition, a novel semiconductive resin composition having improved thermal resistance and mechanical physical properties, and an improved deterioration property is provided. The semiconductive resin composition for a cable includes: 1 to 15 parts by weight of a multiwalled carbon nanotube as a conductive particle, and 1 to 10 parts by weight of an enhancer, based on 100 parts by weight of a composite resin including 10 to 250 parts by weight of an ethylene-(meth)acrylate-based resin and 1 to 100 parts by weight of an olefinic elastomer, based on 100 parts by weight of a polypropylene-based resin.

9 Claims, No Drawings

SEMICONDUCTIVE COMPOSITION FOR POWER CABLE

CROSS-REFERENCE TO RELATED APPLICATIONS

This application claims priority under 35 U.S.C. § 119 to Korean Patent Application No. 10-2017-0098253, filed on Aug. 2, 2017, in the Korean Intellectual Property Office, the disclosure of which is incorporated herein by reference in its entirety.

TECHNICAL FIELD

The following disclosure relates to a semiconductive resin composition which may be used for both of an internal semiconductive layer and an external semiconductive layer of a power cable.

BACKGROUND

In a power cable, a semiconductive layer is formed between a conductive layer and an insulating layer, thereby manufacturing a cable having excellent electrical properties. Examples thereof are disclosed in KR 10-2012-0048520 A and KR 10-2014-0126993 A.

SUMMARY

In a common semiconductive layer, for example, a product obtained by crosslinking a mixture of a polyolefin such as polyethylene and carbon black which is a conductive inorganic particle is used. When polypropylene is used, a metal deactivating additive for preventing deterioration by contact with a metal (conductor) is used.

In the case that a common semiconductive material is used for an external semiconductive layer, when a cable is connected, peelability is not sufficient for peeling off the external semiconductive layer, and connecting the cable, and thus, there is inconvenience for substantially using the material as the external semiconductive layer, and there occur surface unevenness and irreproducibility due to crosslinking, and a protrusion due to reduced dispersibility of conductive powder. Therefore, there is currently needed to develop a composition having excellent peelability and a power cable using the same.

In addition, when deterioration by metal is prevented in a high temperature degradation test, an excellent elongation may be retained, and recycling for various uses is possible, and thus, there is needed to develop a semiconductive resin composition having these properties.

Therefore, there is needed to develop a semiconductive resin composition for a power cable which may adjust peelability, improve dispersibility of conductive particles to remove an aggregate, and decrease an amount of the conductive particles to be used to improve surface smoothness of a cable semiconductive layer, thereby decreasing a thickness of a cable insulator to allow weight lightening.

An embodiment of the present invention is directed to providing a novel semiconductive resin composition for a cable having improved peelability.

Another embodiment of the present invention is directed to providing a semiconductive resin composition having enough dispersibility to remove production of an aggregate of conductive particles.

Another embodiment of the present invention is directed to providing a novel semiconductive resin composition which may decrease a thickness of a cable insulator, and suppress accumulation of a space charge, by using a small amount of conductive particles to improve surface smoothness of a semiconductive layer.

Another embodiment of the present invention is directed to providing a recyclable semiconductive resin composition which prevents aging caused by metal to have excellent mechanical physical properties such as an elongation following a long-term use.

Another embodiment of the present invention is directed to providing a semiconductive resin composition which has improved processing properties and may prevent warping of a cable surface even after manufacturing the cable.

Various aspects of the present invention provide a composition forming a semiconductive layer of a power cable having various structures such as a conductive layer, an internal semiconductive layer, an insulating layer, an external semiconductive layer and a sheath layer.

In one general aspect, a semiconductive resin composition for a cable includes: 1 to 15 parts by weight of a multiwalled carbon nanotube as a conductive particle, and 1 to 10 parts by weight of an enhancer, based on 100 parts by weight of a composite resin including 10 to 250 parts by weight of an ethylene-(meth)acrylate-based resin and 1 to 100 parts by weight of an olefinic elastomer, based on 100 parts by weight of a polypropylene-based resin.

By inventing the semiconductive resin composition, an external semiconductive layer which is peelable in a power cable may be provided, thereby having an effect of significantly improving workability at the time of a cable connection.

In addition, the semiconductive resin composition for a cable has improved dispersibility so that production of an aggregate of conductive particles may be removed, and thus, suppresses occurrence of a space charge which is produced by the aggregate when applying high DC voltage, thereby preventing cable breakage.

In addition, the semiconductive resin composition for a cable may provide a novel semiconductive resin composition, by using a small amount of conductive particles to improve surface smoothness of a cable semiconductive layer, thereby decreasing a thickness of a cable insulator, and accordingly, further improving dispersibility, and to suppress accumulation of a space charge resulted therefrom. In addition, the composition according to various aspects of the present invention provides a recyclable semiconductive resin composition which prevents aging caused by metal to have excellent mechanical physical properties such as an elongation following a long-term use.

The semiconductive resin composition according to an exemplary embodiment of the present invention is more preferred, since the composition includes an olefinic elastomer to have further improved processing properties, relieve stress of a semiconductive layer to prevent warping of a cable surface even after the cable is manufactured, and also may further improve smoothness of a surface of a cable semiconductor layer.

In an exemplary embodiment of the present invention, the polypropylene-based resin may have a melt index of 0.1 to 50 g/10 min, as measured at 230° C. and 2.16 kg.

In an exemplary embodiment of the present invention, the composite resin may have a melt index of 0.1 to 20 g/10 min, as measured at 230° C. and 2.16 kg.

In an exemplary embodiment of the present invention, the multiwalled carbon nanotube may have a diameter of 4 to 40 nm and a length of 10 to 100 μm.

In an exemplary embodiment of the present invention, the conductive particle may further include 1 to 20 parts by weight of any one or more components selected from the group consisting of carbon black, graphite and graphene.

In an exemplary embodiment of the present invention, the ethylene-(meth)acrylate-based resin may have MI (melt index) of 0.1 to 20 g/10 min under the condition of 190° C. and 2.16 kg.

In an exemplary embodiment of the present invention, the ethylene-(meth)acrylate-based resin may include 50 to 99 weight % of a unit derived from an ethylene monomer and 1 to 50 weight % of a unit derived from a (meth)acrylate-based monomer.

In an exemplary embodiment of the present invention, the enhancer may be a polyether-based nonionic surfactant having a phenol group and a terminal hydroxyl group or amine group.

In another general aspect, a cable includes a semiconductive layer manufactured by extruding the semiconductive composition for a cable.

More specifically, the semiconductive layer may be an internal semiconductive layer or an external semiconductive layer.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Hereinafter, the components adopted in various exemplary embodiments of the present invention will be described in detail.

First, the polypropylene-based resin will be described.

As the polypropylene-based resin, a polypropylene homopolymer or a copolymer of propylene with ethylene and/or C1-C8 α-olefin may be used. In addition, the copolymer may include both a block copolymer and a random copolymer having a content of polypropylene of 30 weight % or more, and it is preferred to use the copolymer for strength maintenance and uniformity of processability.

In an exemplary embodiment of the present invention, the polypropylene-based resin has a melting point of 140 to 165° C., specifically 150 to 162° C., it is more preferred to use the propylene homopolymer or copolymer having a melting point within the range is used, compatibility with the olefinic elastomer and/or ethylene-(meth)acrylate-based copolymer is excellent, and mechanical properties such as tensile strength is excellent.

In addition, in an exemplary embodiment, it is preferred that the polypropylene-based resin may have a melt index of 0.1 to 50 g/10 min at 230° C. and 2.16 kg. The melt index is measured in accordance with ASTM D 1238.

In embodiments, under the condition of 230° C. and 2.16 kg, the melt index of the polypropylene is 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 49.5 or 50 g/10 min. The melt index of the polypropylene may be in a range formed by any two numbers selected from those listed in the proceeding sentence.

In addition, in an exemplary embodiment of the present invention, the polypropylene-based resin may be a blend with the following the olefinic elastomer, and it is preferred that the blended composition has a melt index of 0.1 to 20 g/10 min (230° C. and 2.16 kg), since processability or warping due to stress is excellent, and thus, when the cable is stored for a long time after manufacture, atypical bending of the cable is not formed. In embodiments, under the condition of 230° C. and 2.16 kg, the melt index of the composition of the polypropylene blended with the olefinic elastomer is 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19 or 20 g/10 min. The melt index of the blended composition of the polypropylene-based resin and the olefinic elastomer may be in a range formed by any two numbers selected from those listed in the proceeding sentence.

Next, the ethylene-(meth)acrylate-based resin will be described.

In an exemplary embodiment, the ethylene-(meth)acrylate-based resin may be produced by polymerizing 50 to 99 weight % of an ethylene monomer and 1 to 50 weight % of a (meth)acrylate-based monomer. That is, the ethylene-(meth)acrylate-based resin may include 50 to 99 weight % of the unit derived from the ethylene monomer and 1 to 50 weight % of the unit derived from the (meth)acrylate-based monomer. It is preferred to include a content of the (meth)acrylate-based monomer within the range, since flowability of the composition is excellent, and compatibility with the polypropylene-based resin and the olefinic elastomer is increased to increase mechanical physical properties. In addition, it is possible to adjust peelability to an insulating layer of a cable, specifically, an insulating layer including the polypropylene-based resin or the polypropylene-based resin and the olefinic elastomer, and thus, the composition may be used for the external semiconductive layer as well as the internal semiconductive layer.

In embodiments, the ethylene-(meth)acrylate-based resin includes the unit derived from the ethylene monomer in an amount of 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or 99 weight %. In embodiments, the amount of the unit derived from the ethylene monomer in the ethylene-(meth)acrylate-based resin is in a range formed by any two numbers selected from those listed in the proceeding sentence. In embodiments, the ethylene-methacrylate-based resin includes the unit derived from the (meth)acrylate-based monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 weight %. In embodiments, the amount of the unit derived from the (meth)acrylate-based monomer in the ethylene-(meth)acrylate-based resin is in a range formed by any two numbers selected from those listed in the proceeding sentence.

An example of the (meth)acrylate-based monomer may include alkyl (meth)acrylates such as ethyl acrylate, ethyl methacrylate, propyl acrylate, propyl methacrylate, n-butyl acrylate, n-butyl methacrylate, methyl methacrylate and methyl acrylate. C2 to C6 alkyl (meth)acrylate monomer is more preferred for imparting flexibility or mechanical physical properties and an anti-deterioration property. In the present application, the (meth)acrylate-based monomer refers to an acrylate-based or methacrylate-based monomer.

In an exemplary embodiment, the ethylene-(meth)acrylate copolymer resin is not significantly limited, however, for example, it is more preferred that MI is 0.1 to 20 g/10 min under the condition of 190° C. and 2.16 kg for flowability or thermal stability and compatibility, and also better surface uniformity of the manufactured cable. In embodiments, under the conditions of 190° C. and 2.16 kg, the melt index of the ethylene-(meth)acrylate copolymer resin is 0.1, 0.2, 0.3, 0.4, 0.5, 0.6, 0.7, 0.8, 0.9, 1, 2, 3, 4, 5, 6, 7, 8, 8.5, 9, 9.5, 10, 10.5, 11, 11.5, 12, 13, 14, 15, 16, 17, 18, 19 or 20 g/10 min. In one embodiment, the melt index of the ethylene-(meth)acrylate copolymer resin is in a range formed by any two numbers selected from those listed in the proceeding sentence.

In an exemplary embodiment of the present invention, in order to significantly improve peelability particularly, while satisfying volume resistivity or other physical properties measured in the exemplary embodiment of the present invention, it is preferred to use a content of the ethylene-(meth)acrylate copolymer resin at 10 to 250 parts by weight, preferably 50 to 200 parts by weight, and more preferably 60 to 150 parts by weight, based on 100 parts by weight of the polypropylene component, for improving peelability.

In embodiments, the composition includes the ethylene-(meth)acrylate copolymer resin in an amount of 10, 15, 20, 25, 30, 35, 40, 45, 50, 55, 60, 65, 70, 75, 80, 85, 90, 92, 95, 97, 100, 102, 105, 108, 110, 112, 115, 117, 120, 122, 123, 124, 125, 128, 130, 132, 134, 135, 136, 137, 137.5, 138, 140, 142, 145, 148, 150, 152, 155, 158, 160, 165, 170, 175, 180, 185, 190, 195, 200, 205, 210, 215, 220, 225, 230, 235, 240, 245 or 250 parts by weight, based on 100 parts by weight of polypropylene. In one embodiment, the ethylene-(meth)acrylate copolymer resin is included in an amount in a range formed by any two numbers selected from those listed in the proceeding sentence.

Next, the olefinic elastomer will be described.

In an exemplary embodiment, the olefinic elastomer may refer to an ethylene-propylene-diene-based elastomer or a styrene and olefin copolymer elastomer.

In an exemplary embodiment, the ethylene-α-olefin-diene resin refers to an ethylene propylene diene monomer (EPDM), representatively, and has thermal stability and electrical properties, thereby having a characteristic of being variously used for industrial components.

The EPDM resin may include 30 weight % to 80 weight %, more specifically 40 weight % to 80 weight % of an ethylene unit, 20 weight % to 60 weight % of an α-olefin unit, and 0 weight % to 10 weight % of a diene unit.

In embodiments, the EPDM resin includes ethylene units in an amount of 30, 35, 40, 45, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79 or 80 weight %. In embodiments, the amount of ethylene units in the EPDM resin is in a range formed by any two numbers selected from those listed in the proceeding sentence. In embodiments, the EPDM resin includes alpha olefin units in an amount of 20, 25, 30, 35, 40, 45, 50, 51, 52, 53, 54, 55, 56, 57, 58, 59 or 60 weight %. In embodiments, the amount of alpha olefin units in the EPDM resin is in a range formed by any two numbers selected from those listed in the proceeding sentence. In embodiments, the EPDM resin includes diene units in an amount of 0.1, 0.5, 1, 2, 3, 4, 5, 6, 7, 8, 9 or 10 weight %. In embodiments, the amount of diene units in the EPDM resin is in a range formed by any two numbers selected from those listed in the proceeding sentence.

The α-olefin unit may be branched, straight chain or cyclic α-olefin unit having 3 to 18 carbon atoms, and may be for example, propylene, 1-butene, 1-pentene, 3-methyl-1-butene, 1-hexene, 3-methyl-1-pentene, 4-methyl-1-pentene, 1-heptene, 3-methyl-1-hexene, 4-metehyl-1-hexene, 5-methyl-1-hexene, 3-ethyl-1-pentene, 1-octene, 3-methyl-1-heptene, 4-methyl-1-heptene, 5-methyl-1-heptene, 6-methyl-1-heptene, 3-ethyl-1-hexene, 4-ethyl-1-hexene, 3-propyl-1-pentene, 1-decene, and the like.

In addition, in an exemplary embodiment, as the olefinic elastomer, styrene ethylene butylene styrene (SEBS) may be representatively used, SEBS being an elastic body having an ethylene-butylene polymer or a butylene polymer part as a soft segment between a polystyrene part as a hard segment, and other elastomers in various forms, for example, styrene butadiene styrene (SBS), styrene isoprene styrene (SIS), SEBS, styrene ethylene propylene styrene (SEPS) available from Kraton, or a blend thereof may be included, but not limited thereto.

The content of the olefinic elastomer may be 1 to 100 parts by weight, more specifically 1 to 50 parts by weight, based on 100 parts by weight of the polypropylene-based resin.

In embodiments, the composition includes the olefinic elastomer in an amount of 1, 5, 10, 15, 20, 25, 30, 35, 40, 45 or 50 parts by weight, based on 100 parts by weight of polypropylene. In one embodiment, the olefinic elastomer resin is included in the composition in an amount in a range formed by any two numbers selected from those listed in the proceeding sentence.

In an exemplary embodiment, when a blend of the polypropylene-based resin and the olefinic elastomer is used, it is more preferred to prepare beforehand the blend of polypropylene and the elastomer which is then formed into a pellet, or a commercialized product which was prepared beforehand with elastic polypropylene to have elasticity in a reactor may be used instead. Accordingly, among the terms of the present application, a mixture of polypropylene and the elastomer may be used to have a concept to include the commercialized product also.

Next, the multiwalled carbon nanotube will be described.

The multiwalled carbon nanotube may be a high-purity carbon nanotube prepared by removing a catalyst by aqueous phase oxidation, and removing amorphous carbon by high temperature heat treatment. Since the multiwalled carbon nanotube may be easily purchased, it will not be specifically described any more in the present specification.

In an exemplary embodiment, the multiwalled carbon nanotube is not particularly limited, but preferably has a diameter of 4 to 40 nm and a length of 10 to 100 μm, and more preferably has an aspect ratio (length/diameter) of 100 to 1000, for minimizing dispersibility and aggregation, but not limited thereto.

In embodiments, the carbon nanotubes have a diameter of 4, 5, 6, 7, 7.5, 8, 8.5, 9, 9.5, 10, 10.5, 11, 11.5, 12, 12.5, 13, 13.5, 14, 14.5, 15, 15.5, 16, 17, 18, 19, 20, 21, 22, 23, 24, 25, 26, 27, 28, 29, 30, 31, 32, 33, 34, 35, 36, 37, 38, 39 or 40 nm. The diameter of the carbon nanotubes may be a range formed by any two numbers selected from those listed in the proceeding sentence.

In embodiments, the carbon nanotubes have a length of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98 or 100 µm. The length of the carbon nanotubes may be in a range formed by any two numbers selected from those listed in the proceeding sentence.

In embodiments, with respect to the diameter of the carbon nanotubes of each of 4, 5, 6, 7, 7.5, 8, 8.5, 9, 9.5, 10, 10.5, 11, 11.5, 12, 12.5, 13, 13.5, 14, 14.5, 15, 15.5, 16, 17, 18, 19, 20, 21, 22, 23, 24, 25, 26, 27, 28, 29, 30, 31, 32, 33, 34, 35, 36, 37, 38, 39 and 40 nm, the carbon nanotubes have a length of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98 or 100 µm.

In embodiments, the carbon nanotubes have an aspect ratio (which is ratio of its length with respect to its diameter) of 100, 110, 120, 130, 140, 150, 160, 170, 180, 190, 200, 210, 220, 230, 240, 250, 260, 270, 280, 290, 300, 310, 320, 330, 340, 350, 360, 380, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980 or 1000. The aspect ratio of the carbon nanotubes may be in a range formed by any two numbers selected from those listed in the proceeding sentence. In an exemplary embodiment, the multiwalled carbon nanotube is not particularly limited, but may be used at 1 to 15 parts by weight, more specifically 5 to 10 parts by weight, based on 100 parts by weight of the composite resin. In embodiments, the composition includes the carbon nanotubes in an amount of 1, 5, 10, 15, 20, 25, 30, 35, 40, 45 or 50 parts by weight, based on 100 parts by weight of the composite resin. In one embodiment, the ethylene-(meth)acrylate copolymer resin is included in an amount in a range formed by any two numbers selected from those listed in the proceeding sentence. In an exemplary embodiment, by adopting the multiwalled carbon nanotube, the content of conductive particles may be greatly decreased, occurrence of an aggregate due to use of an excessive amount of conventional carbon black, graphene, or the like may be eliminated, and in particular, accumulation of a space charge is suppressed to extend a cable life, which is thus preferred. In addition, since a thickness of a cable insulator may be decreased by improving surface smoothness of the cable semiconductor layer, an effect of having excellent workability and mobility may be possessed.

In an exemplary embodiment, the multiwalled carbon nanotube has better dispersibility, and further improves an effect of preventing space charge occurrence also, when the multiwalled carbon nanotube is combined with the composite resin component.

In addition, localized carbonization at the time of processing is fundamentally blocked by decreasing the aggregation and the inorganic particles, and thus, space charge occurrence which may occur by carbonized particles is also suppressed.

In another exemplary embodiment of the present invention, in addition to the multiwalled carbon nanotube as the conductive particle, carbonaceous particles which are commonly used in the art may be further mixed therewith and used. In an exemplary embodiment, an example of the conductive particle may include carbon particles such as carbon black, graphite and graphene, and the conductive particle may have a surface area of 20 to 1,500 $m^2/g$. In this case also, since the content of the mixture to be used is greatly decreased, as compared with the previously used amount of carbonaceous particles, the effect of the present invention may be achieved to some extent.

In an exemplary embodiment, when the carbonaceous particles are mixed, the content is not particularly limited, but may be used at 1 to 20 parts by weight, more specifically 2 to 15 parts by weight, based on 100 parts by weight of the composite resin.

Next, the enhancer will be described.

In an exemplary embodiment, the enhancer is a component to improve electrical repulsive force of the multiwalled carbon nanotube, thereby further improving the physical properties such as volume resistivity. In various embodiments of the present invention, it is preferred that the content of the enhancer is 1 to 10 parts by weight, based on 100 parts by weight of the composite resin, but not limited thereto.

In an exemplary embodiment, as the enhancer, an ionic or non-ionic surfactant may be used, however, when a polyester-based non-ionic surfactant having a phenol group, and hydroxyl group, alcohol and amine as a terminal polar group is used, though not described in a separate Comparative Example, it was found from repetitive experiments that surface smoothness is better, and also volume resistivity is further lowered, which is preferred.

Next, a preparation method according to various exemplary embodiments of the present invention will be briefly described.

The preparation method of the semiconductive resin composition for a cable according to various exemplary embodiments of the present invention is not particularly limited. For example, the resin composition may be prepared by kneading 1 to 15 parts by weight of the multiwalled carbon nanotube as the conductive particle, 1 to 10 parts by weight of the enhancer, and other additives, based on 100 parts by weight of the composite resin including 10 to 250 parts by weight of the ethylene-(meth)acrylate-based resin and 1 to 100 parts by weight of the olefinic elastomer, based on 100 parts by weight of the polypropylene-based resin, at about 150 to 230° C. for about 5 to 15 minutes, using a mixing roll.

Here, the carbon nanotube may be added directly, or in the form of masterbatch. In addition, the semiconductive composition may be stirred using a kneader mixture, a dispersion kneader, a buss kneader, a twin screw extender, or the like, for uniformly dispersing the carbon nanotubes in the base resin.

Meanwhile, in various exemplary embodiments of the present invention, though it is not particularly limited, common viscosity controlling agents, UV protection agents, antioxidants, releasing agents, lubricants and inorganic additives may be used within a range of not damaging the nature of the present invention, but a detailed description will be omitted.

The composition according to the present invention may adjust peelability, and freely adjust peelability as the internal semiconductive layer or external semiconductive layer, thereby satisfying various physical properties to be required.

In addition, the composition according to the present invention provides a composition which solves the problem of inferior processability due to the use of conventional polypropylene having a high melting point, and may fundamentally decrease a carbonated spot which may occur sometimes at the time of processing, thereby minimizing change in the physical properties due to processing conditions.

In addition, the present invention may provide a recyclable semiconductive resin composition which prevents aging caused by metal to have excellent mechanical physical properties such as an elongation following a long-term use.

In addition, the present invention further improves deterioration due to the long-term use at high voltage, thereby minimizing degradation of physical properties, or change to brittleness due to degradation of elasticity following a long-term use, so that the physical properties may be retained at the time of reuse.

In addition, the present resin composition has improved dispersibility so that production of an aggregate of conductive particles may be removed, and thus, suppresses occurrence of a space charge which is produced by the aggregate when applying high DC voltage, thereby preventing cable breakage.

In addition, the present invention may provide a novel semiconductive resin composition which uses a small amount of conductive particles to improve surface smoothness of a cable semiconductive layer, thereby decreasing a thickness of a cable insulator, and accordingly, may further improve dispersibility, and thus, lower a space charge.

In addition, the present invention may provide a recyclable semiconductive resin composition which prevents aging caused by metal to have excellent mechanical physical properties such as an elongation following a long-term use.

In addition, the present invention is more preferred, since by adding the olefinic elastomer, processing properties are improved, stress of a semiconductive layer is relieved to prevent warping of a cable surface even after the cable is manufactured, and also may further improve smoothness of a surface of a cable semiconductor layer.

The effects described in the specification which is expected by the technical features of the present invention and the intrinsic effects are regarded as being described in the specification of the present invention, though the effects are not explicitly mentioned in the present invention.

EXAMPLES

Hereinafter, the present invention will be described in detail by the Examples of the present invention. In the present invention, the exemplary embodiments are not limited to the Examples, and may be carried out by being modified in various forms within the scope of the technical idea, and thus, the present invention is not limited to the Examples, and the Examples are only provided as an auxiliary means which may deliver the technical idea of the present invention well.

In addition, the singular form of the term used in the present application may be intended to also include a plural form, unless otherwise indicated.

Further, unless otherwise stated, the unit of % herein refers to weight %.

Hereinafter, the present invention will be described in detail by the Examples, however, the Examples are for describing the present invention in more detail, and the scope of the present invention is not limited to the following Examples.

Examples 1 to 7 and Comparative Examples 1 to 3

In the Examples of the present invention, the components having the composition ratios as shown in the following Table 1 were sufficiently mixed and kneaded, and then extruded, thereby evaluating a specimen.

As the olefinic elastomer, a pellet prepared by blending beforehand the olefinic elastomer with polypropylene. The physical properties thereof were measured, and the results are listed in Table 1.

In addition, each composition component used in the following Table 1 was as follows:

Polypropylene (PP) was a polypropylene homopolymer having a melt index of 5 g/10 min, as measured in accordance with ASTM D 1238 under the condition of 230° C. and 2.16 kg, and a melting point of 161° C.

An olefinic elastomer (OE) was an ethylene propylene-diene terpolymer, and Suprene S501A available from SK Global Chemical Co., Ltd., was used.

Ethylene-ethyl acrylate (EEA) was an ethylene-ethyl acrylate resin having a melt index of 10 g/10 min, as measured in accordance with ASTM D 1238 under the condition of 190° C. and 2.16 kg, and a content of ethyl acrylate of 17 weight %.

Ethylene-vinyl acetate (EVA) was an ethylene-vinyl acetate resin having a melt index of 12 g/10 min, as measured in accordance with ASTM D 1238 under the condition of 190° C., 2.16 kg, and a content of vinyl acetate of 15 weight %.

TABLE 1

| | | Example | | | | | | | Comparative Example | | |
|---|---|---|---|---|---|---|---|---|---|---|---|
| Composition component | | 1 | 2 | 3 | 4 | 5 | 6 | 7 | 1 | 2 | 3 |
| Resin | PP | 75 | 85 | 40 | 75 | 65 | 40 | 65 | 95 | 65 | 45 |
| | OE | 5 | 5 | 5 | 5 | 5 | 5 | 5 | 5 | 5 | — |
| | EEA | 20 | 10 | 55 | 20 | 30 | 55 | 30 | — | — | 55 |
| | EVA | — | — | — | — | — | — | — | — | 30 | — |
| | Total (part by weight) | 100 | 100 | 100 | 100 | 100 | 100 | 100 | 100 | 100 | 100 |
| Multiwalled carbon nanotube (part by weight) (8~15 nm, 10~50 μm) | | 5 | 10 | 10 | 5 | 5 | 5 | 5 | — | 5 | 10 |
| Enhancer (part by weight) t-Octylphenoxypolyethoxyethanol | | 1 | 1 | 1 | 1 | 1 | 1 | 1 | — | 1 | 1 |
| Carbon black (75 m²/g) (part by weight) | | — | — | — | 5 | 15 | 15 | 15 | 45 | 15 | — |
| Deterioration inhibitor (*1) (part by weight) | | 0.5 | 0.5 | 0.5 | 0.5 | 0.5 | 0.5 | — | 0.5 | 0.5 | 0.5 |
| Antioxidant (*2) (part by weight) | | 1.5 | 1.5 | 1.5 | 1.5 | 1.5 | 1.5 | 2.0 | 1.5 | 1.5 | 1.5 |

TABLE 1-continued

|  |  | Example | | | | | | | Comparative Example | | |
|---|---|---|---|---|---|---|---|---|---|---|---|
| Composition component | | 1 | 2 | 3 | 4 | 5 | 6 | 7 | 1 | 2 | 3 |
| Volume resistivity ($\Omega \cdot cm$)(*3) | 23° C. | 69 | 12 | 19 | 18 | 8 | 9 | 7 | 37 | 28 | 75 |
|  | 110° C. | 143 | 62 | 80 | 86 | 21 | 28 | 45 | 228 | 215 | 225 |
|  | 130° C. | 115 | 54 | 72 | 62 | 13 | 19 | 145 | 211 | 204 | 210 |
| Room temperature (*4) | Tensile strength (N/mm$^2$) | 18.9 | 18.3 | 17.9 | 18.0 | 17.2 | 17.0 | 16.9 | 13.2 | 14.7 | 12.3 |
|  | Elongation (%) | 697 | 629 | 610 | 604 | 563 | 543 | 582 | 432 | 511 | 330 |
| After heating (150° C., 168 hrs)(*5) | Tensile retention (%) | 99 | 99 | 97 | 97 | 96 | 92 | 86 | 85 | 83 | 81 |
|  | Stretch retention (%) | 98 | 97 | 97 | 96 | 95 | 91 | 83 | 83 | 81 | 79 |
| Degree of peeling (*6) | X: not peeled ◯: peelable | X | X | ◯ | X | X | ◯ | X | X | X | ◯ |
| Surface smoothness (*7) | (Width, number of protrusions) EA/1 cm$^2$ | 1 | 2 | 2 | 2 | 4 | 4 | 3 | 17 | 9 | 15 |

(*1) Deterioration inhibitor: 2',3-bis[3-(3,5-di-tert-butyl-4-hydroxyphenyl)propionyl] propionohydrazide
(*2) Antioxidant: a quantitative mixture of tetrakismethylene(3,5-di-t-butyl-4-hydroxyhydrocinnamate)methane/2,2'-Thio-bis(ethyl-β-3,5-di-tert-butyl-4-hydroxyphenyl)propionate/Dioctadecyl 3,3'-thiodipropionate
(*3)Measured in accordance with the method of ASTM D 991, at 23° C., 110° C. and 130° C.
(*4) The semiconductive resin composition was measured in accordance with the method of ASTM D 638, at 23° C.
(*5)The semiconductive resin composition was measured in accordance with the method ASTM D 638, at 150° C.
(*6) A degree of peeling between the semiconductive composition and the insulator (90 parts by weight of the polypropylene-based resin/10 parts by weight of the olefinic elastomer (Suprene S501A)) was measured at a peeling rate of 250 mm/min and a peeling angle of 180° in accordance with the method of ASTM D 903.
(*7) The number and width of protrusions on the surface of the extruded sheet was measured using continuous magnification observation equipment at X80. The size of protrusion was based on those of 0.05 to 0.10 mm.

As a result of the Examples and the Comparative Examples, the Examples of the present invention had very good surface smoothness, had low volume resistivity, so that the Example may be used for the semiconductive layer for a cable, had a very good tensile strength-elongation property, and had very good tensile strength retention and stretch retention properties after heating.

Accordingly, since the composition according to the Example of the present invention includes a low content of the conductive particles, original physical properties of a polymer are not deteriorated, and also peeling may be adjusted, a peelable composition may be used for the external semiconductive material, and a non-peelable composition may be used for the internal semiconductive material.

That is, the resin composition according to the Example of the present invention was peeled off in the peeling test, and thus, may be used as a material of the external conductive layer, it is recognized that connection workability of the cable is easy. Also, volume resistivity depending on temperature is not greatly influenced, thereby preventing accelerated aging due to change in resistance following a long-term use. In addition, both the elongation and the tensile retention after aging satisfied 80% or more, and furthermore, 90% or more which is excellent, and thus, it is recognized that the composition improves peeling force and also has excellent properties in other physical properties.

What is claimed is:

1. A semiconductive resin composition for a cable prepared by comprising: 1 to 15 parts by weight of a multi-walled carbon nanotube as a conductive particle, and 1 to 10 parts by weight of an enhancer, based on 100 parts by weight of a composite resin including 10 to 250 parts by weight of an ethylene-(meth)acrylate-based resin and 1 to 100 parts by weight of an olefinic elastomer, based on 100 parts by weight of a polypropylene-based resin.

2. The semiconductive resin composition for a cable of claim 1, wherein the polypropylene-based resin has a melt index of 0.1 to 50 g/10 min, as measured at 230° C. and 2.16 kg.

3. The semiconductive resin composition for a cable of claim 1, wherein the composite resin has a melt index of 0.1 to 20 g/10 min, as measured at 230° C. and 2.16 kg.

4. The semiconductive resin composition for a cable of claim 1, wherein the multiwalled carbon nanotube has a diameter of 4 to 40 nm and a length of 10 to 100 μm.

5. The semiconductive resin composition for a cable of claim 1, wherein the conductive particle further includes 1 to 20 parts by weight of any one or more components selected from the group consisting of carbon black, graphite and graphene.

6. The semiconductive resin composition for a cable of claim 1, wherein the ethylene-(meth)acrylate-based resin has MI of 0.1 to 20 g/10 min, as measured under a condition of 190° C. and 2.16 kg.

7. The semiconductive resin composition for a cable of claim 6, wherein the ethylene-(meth)acrylate-based resin includes 50 to 99 weight % of a unit derived from an ethylene monomer and 1 to 50 weight % of unit derived from a (meth)acrylate-based monomer.

8. The semiconductive resin composition for a cable of claim 1, wherein the enhancer is a polyether-based nonionic surfactant having a phenol group and a terminal hydroxyl group or amine group.

9. A cable comprising a semiconductive layer manufactured by extruding the semiconductive composition for a cable of claim 1.

* * * * *